(12) United States Patent
Lee et al.

(10) Patent No.: US 6,640,546 B2
(45) Date of Patent: Nov. 4, 2003

(54) FOIL FORMED COOLING AREA ENHANCEMENT

(75) Inventors: Ching-Pang Lee, Cincinnati, OH (US); Melvin Robert Jackson, Niskayuna, NY (US); Stephen Joseph Ferrigno, Cincinnati, OH (US); Ji-Cheng Zhao, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/028,409

(22) Filed: Dec. 20, 2001

(65) Prior Publication Data

US 2003/0115882 A1 Jun. 26, 2003

(51) Int. Cl.[7] ................................. F01D 5/14
(52) U.S. Cl. ..................... 60/752; 60/754; 415/178; 416/95
(58) Field of Search .............. 60/752, 754, 806; 415/177, 178; 416/95

(56) References Cited

U.S. PATENT DOCUMENTS

| 4,004,056 A | 1/1977 | Carroll | 428/138 |
|---|---|---|---|
| 4,064,300 A | 12/1977 | Bhangu | 428/120 |
| 4,142,824 A | 3/1979 | Andersen | 415/115 |
| 4,709,643 A | * 12/1987 | Moreno et al. | 110/336 |
| 5,295,530 A | 3/1994 | O'Connor et al. | 164/516 |
| 5,321,951 A | 6/1994 | Falls et al. | 60/748 |
| 5,337,568 A | 8/1994 | Lee et al. | 60/755 |
| 5,353,865 A | 10/1994 | Adiutori et al. | 165/133 |
| 5,368,441 A | 11/1994 | Sylvestro et al. | 416/97 R |
| 5,427,866 A | 6/1995 | Nagaraj et al. | 428/610 |
| 5,626,462 A | 5/1997 | Jackson et al. | 416/97 R |
| 5,810,552 A | 9/1998 | Frasier | 415/115 |
| 5,975,850 A | 11/1999 | Abuaf et al. | 416/97 R |
| 6,142,734 A | 11/2000 | Lee | 416/97 R |
| 6,213,714 B1 | 4/2001 | Rhodes | 416/96 R |
| 6,302,185 B1 | 10/2001 | Lee et al. | 164/45 |
| 6,397,765 B1 | * 6/2002 | Becker | 110/336 |
| 6,408,610 B1 | * 6/2002 | Caldwell et al. | 60/782 |
| 6,530,225 B1 | * 3/2003 | Hadder | 60/772 |

* cited by examiner

*Primary Examiner*—Ehud Gartenberg
(74) *Attorney, Agent, or Firm*—David L. Narciso; Pierce Atwood

(57) ABSTRACT

A wall structure for a gas turbine engine component is provided which comprises a wall having a first side facing a flow of hot gases and a second side exposed to a source of cooling fluid. The wall has a plurality of holes formed therethrough, and an outer layer disposed on the first side. The holes greatly increase the wetted surface area of the wall exposed to cooling flow.

28 Claims, 6 Drawing Sheets

US 6,640,546 B2

FOIL FORMED COOLING AREA ENHANCEMENT

BACKGROUND OF THE INVENTION

This invention relates generally to gas turbine engines and more particularly to gas turbine engine components formed in part from high temperature foil materials.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan. Each turbine stage commonly includes a stationary turbine nozzle followed in turn by a turbine rotor.

Gas turbine engine hot section components, in particular the combustor and high pressure turbine section components, operate at extremely high temperatures and need to be cooled to have acceptable longevity. Cooling is typically provided by extracting relatively cool air from an upstream location of the engine and routing the cooling air to components where it is needed. Conventionally the components to be cooled are hollow and have provisions for receiving and distributing the cooling air by various methods, for example the components may be film cooled by providing a plurality of passages which eject a blanket of cooling air over the surface of the component, or the components may be convectively cooled by causing the cooling air to flow through various internal passages.

Because the rate of heat transfer from a component is proportional to the wetted area (i.e. the surface area exposed to cooling flow), known methods of improving heat transfer include various ways of increasing the wetted area.

Rough elements, such as dimples, cavities or short pins, have been commonly used in many designs to enhance the wetted surface area. The enhancement is quantified by the ratio of the increased surface area to the original surface area, $A/A_o$. These elements are often incorporated in cast components. Therefore, the size of the features and the surface area enhancement are limited by the capabilities of the casting process. The enhancement $A/A_o$ with cast features is normally less than about 2.0. Other surface area enhancement techniques are known, such as the application of particles to a mold to create cavities in the as-cast surface of a part, or weld build-up to create miniature surface elements, e.g. small diameter hemispheres. The surface area enhancement ratio of these techniques is typically not much greater than about 2.5.

Accordingly, there is a need for a technique that can increase the wetted surface area of a component exposed to high temperature operation to a greater degree than previous methods.

BRIEF SUMMARY OF THE INVENTION

The above-mentioned need is met by the present invention, which provides a wall structure for a gas turbine engine component which comprises a wall having a first side facing a flow of hot gases and a second side exposed to a source of cooling fluid. The wall has a plurality of holes formed therethrough, and an outer layer disposed on the first side. The holes greatly increase the wetted surface area of the wall exposed to cooling flow.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
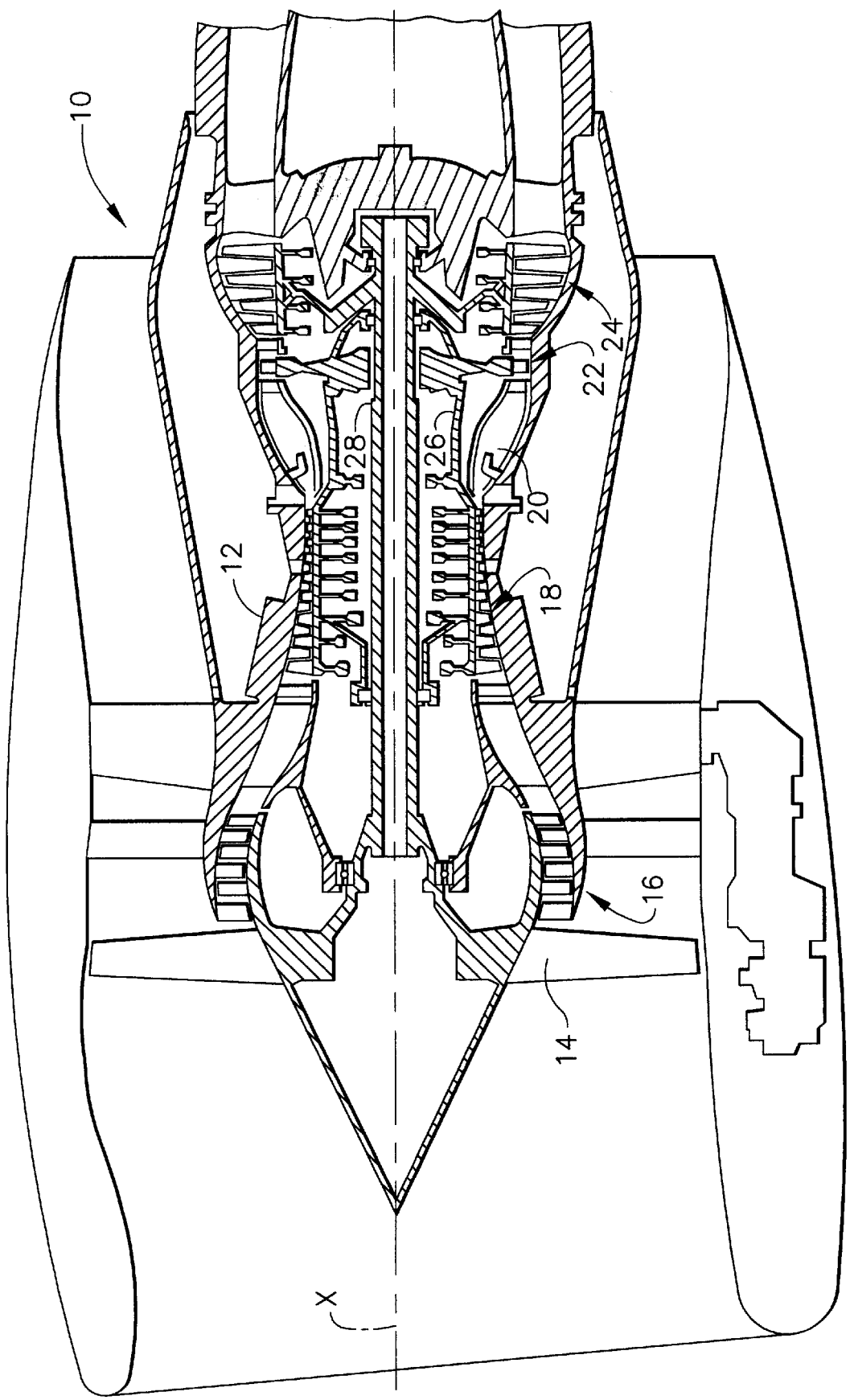
FIG. 1 illustrates a cross-sectional view of an exemplary gas turbine engine.

Referring to the drawings wherein identical reference numerals denote the same elements throughout the various views, FIG. 1 illustrates a gas turbine engine, generally designated 10. The engine 10 has a longitudinal center line or axis X and an outer stationary annular casing 12 disposed concentrically about and coaxially along the axis X. The engine 10 has a fan 14, booster 16, compressor 18, combustor 20, high pressure turbine 22, and low pressure turbine 24 arranged in serial flow relationship. In operation, pressurized air from the compressor 18 is mixed with fuel in the combustor 20 and ignited, thereby generating combustion gases. Some work is extracted from these gases by the high pressure turbine 22 which drives the compressor 18 via an outer shaft 26. The combustion gases then flow into a low pressure turbine 24, which drives the fan 14 and booster 16 via an inner shaft 28. The fan 14 provides the majority of the thrust produced by the engine 10, while the booster 16 is used to supercharge the air entering the compressor 18.

Figure 2:
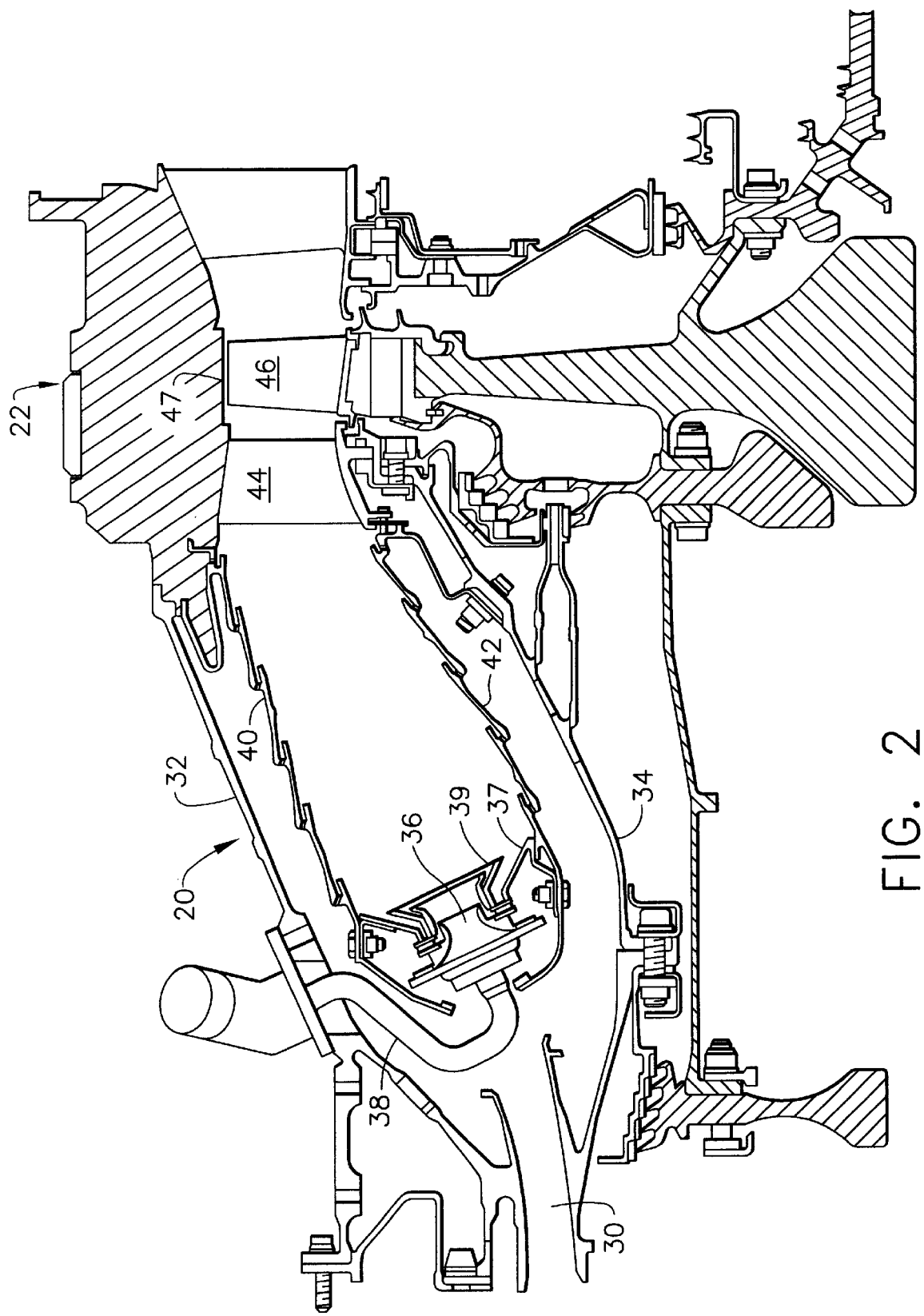
FIG. 2 is a cross-sectional view of the combustor and high pressure turbine section of the gas turbine engine of FIG. 1.

FIG. 2 illustrates the combustor 20 and high pressure turbine 22 of the gas turbine engine 10 of FIG. 1. Compressed air from the compressor 18 is introduced through a diffuser 30 into an annular cavity defined by the outer combustor case 32 and the inner combustor case 34. A portion of the compressed air passes through a swirl nozzle 36, where it is mixed with fuel supplied through a fuel tube 38. The swirl nozzle 36 is received in a dome assembly 37 which includes a splash plate 39. The flame is confined and directed downstream by the outer combustor liner 40 and the inner combustor liner 42, which are attached to the dome assembly 37 at their forward ends. The hot gases then leave the combustor 20 and enter the high pressure turbine 22, which comprises one or more stages of stationary nozzles 44 alternated with rotating blades 46. The flowpath past the blades 46 is defined in part by an annular shroud 47 which encircles the blades 46 and may be formed from a plurality of arcuate shroud segments 49, described below. Various portions of the combustor 20 are fabricated from thin castings, forgings, or sheets of known materials, such as nickel-or cobalt-based superalloys, for example the inner and outer liners 42 and 40, the dome assembly 37, and the splash plate 39. These components have one side subjected to a flow of hot gases while the opposite side is subject to a flow of cooling fluid.

Figure 3:
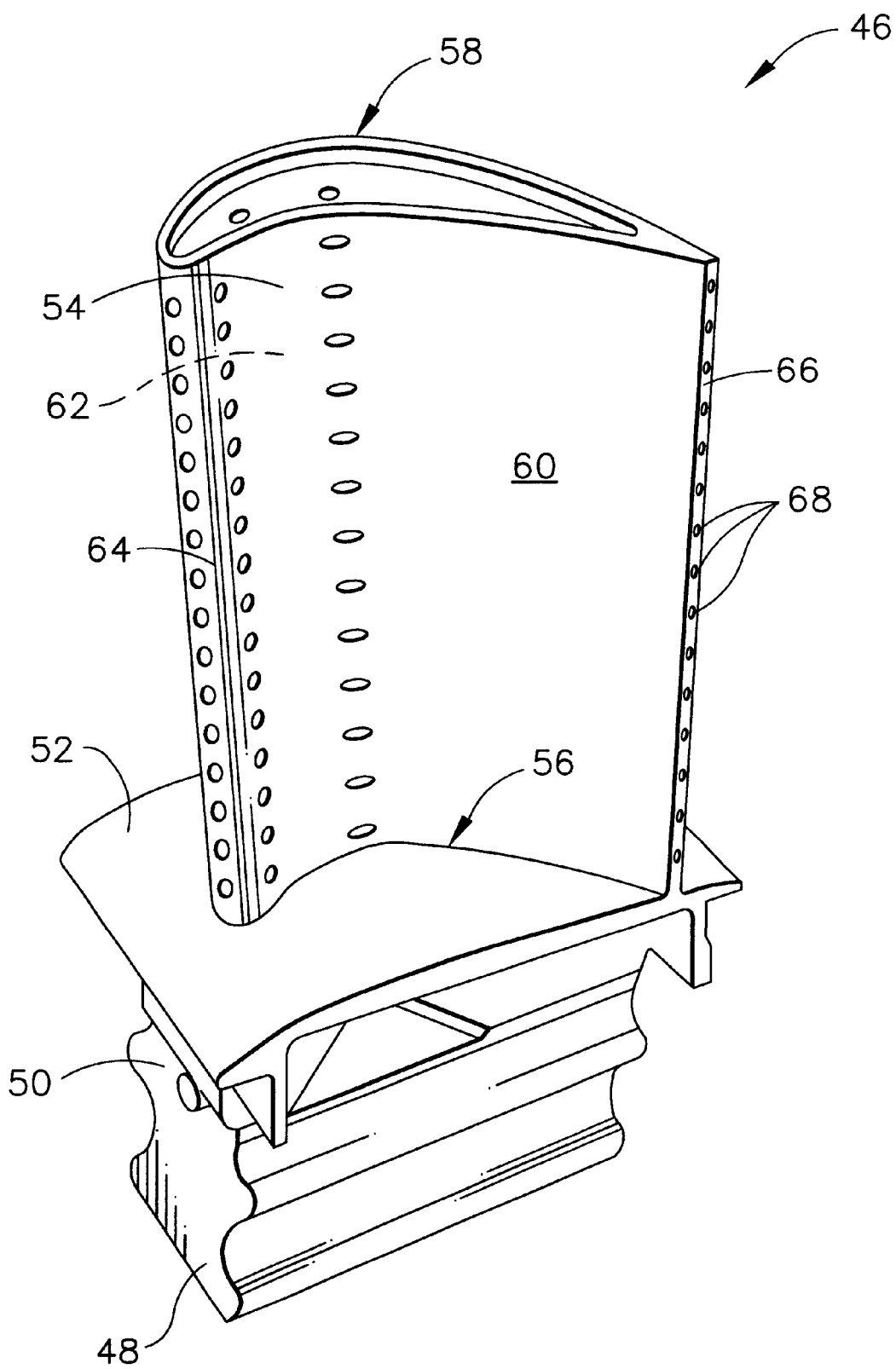
FIG. 3 is a perspective view of a representative turbine blade.

FIG. 3 depicts a typical turbine blade 46 of engine 10. The turbine blade 46 is generally representative of other turbine airfoils, such as turbine nozzles 44, to which the present invention is equally applicable. The turbine blade 46 includes a conventional dovetail 48, which may have any suitable form including tangs that engage complementary tangs of a dovetail slot in a rotor disk (not shown) for radially retaining the blade 46 to the disk as it rotates during operation. A blade shank 50 extends radially upwardly from the dovetail 48 and terminates in a platform 52 that projects laterally outwardly from and surrounds the shank 50. A hollow airfoil 54 extends radially outwardly from the platform 52 and into the hot gas stream. The airfoil 54 has a root 56 at the junction of the platform 52 and the airfoil 54, and a tip 58 at its radially outer end. The airfoil 54 has a concave pressure side wall 60 and a convex suction side wall 62 joined together at a leading edge 64 and at a trailing edge 66. The airfoil 54 may take any configuration suitable for extracting energy from the hot gas stream and causing rotation of the rotor disk. The turbine blade 46 is preferably formed as a one-piece casting of a suitable superalloy, such as a nickel-based superalloy, which has acceptable strength at the elevated temperatures of operation in a gas turbine engine. The airfoil 54 may incorporate a plurality of trailing edge cooling holes 68, or it may incorporate a plurality of trailing edge bleed slots on the pressure side wall 60 of the airfoil 54 (not shown). The turbine blade 46 and the integral airfoil 54 are hollow and have relatively thin walls, for example the pressure and suction side walls 60 and 62, which have an outer surface exposed to hot combustion gases, while their inner side is exposed to the interior of the turbine blade 46, which has provisions for receiving and distributing cooling air flow in a known manner.

Figure 4:
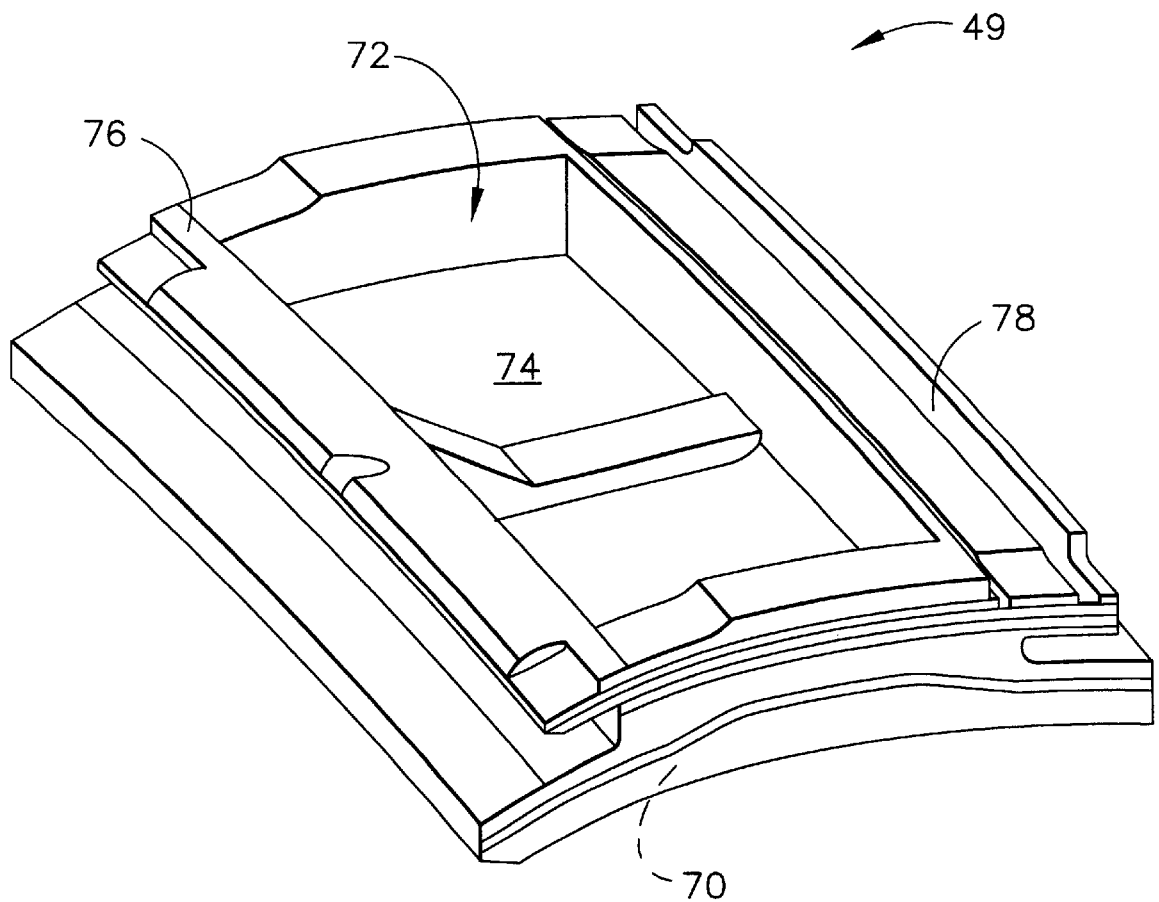
FIG. 4 is a perspective view of a representative turbine shroud segment.

FIG. 4 illustrates an exemplary shroud segment 49, which forms a portion of the arcuate turbine shroud 47. The shroud segment 49 is generally arcuate in shape and is typically cast from a known nickel-or cobalt-based superalloy. The shroud segment 49 has a flowpath surface 70 exposed to hot flowpath gases and a backside 72 which is provided with flow of cooling air in a known manner. The segment 49 has a relatively thin central portion 74, and thickened forward and aft portions defining arcuate forward and aft mounting rails 76 and 78, respectively.

Figure 5:
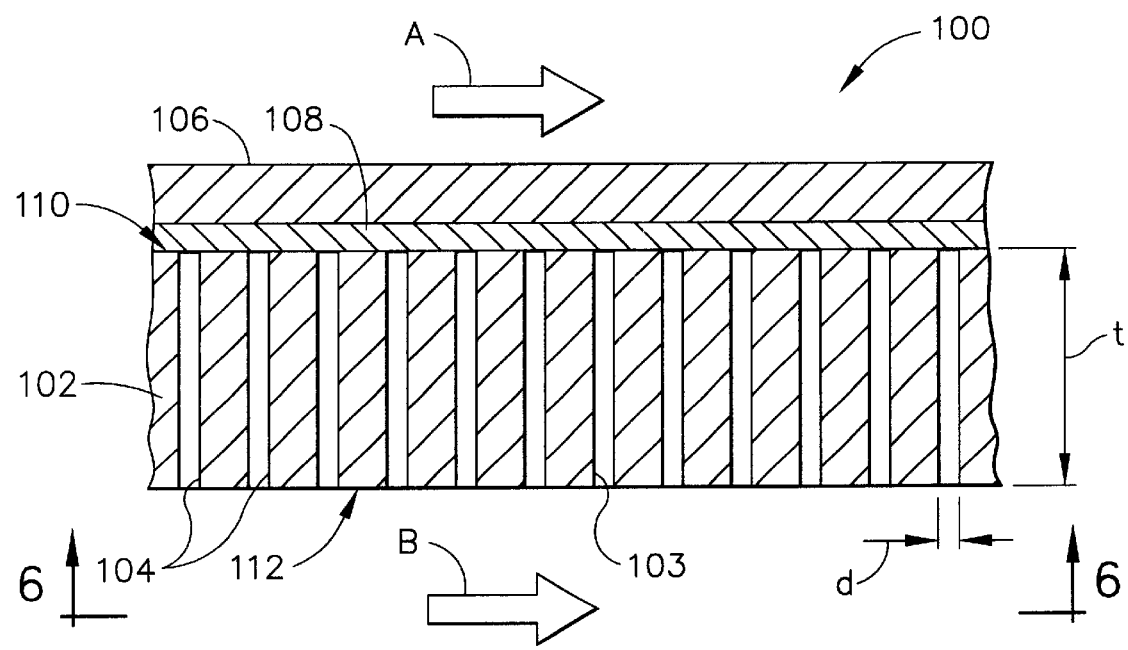
FIG. 5 is a partial cross-sectional view of a wall structure in accordance with the present invention.
Figure 6:
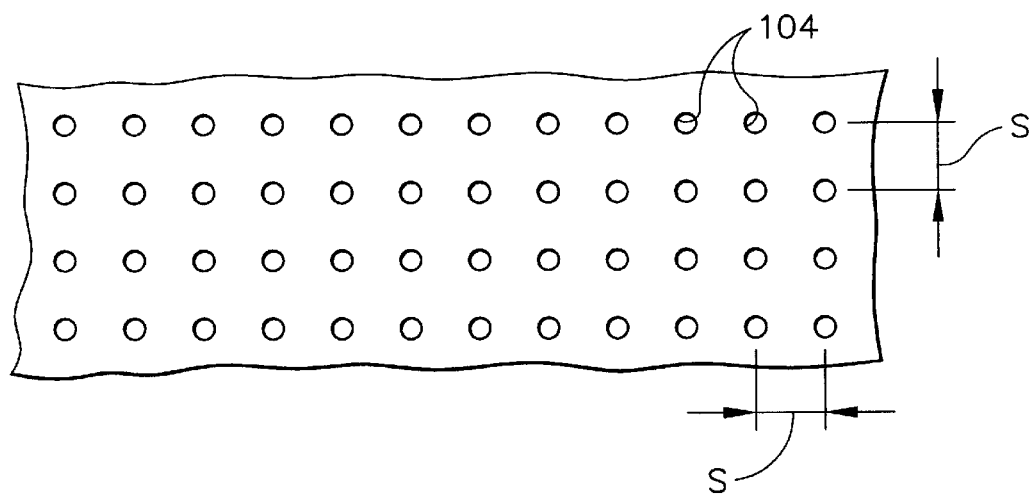
FIG. 6 is a view of the wall structure taken along lines 6-6 of FIG. 5.

FIGS. 5 and 6 illustrate a wall structure 100 in accordance with the present invention. The wall structure 100 is illustrative of a structure that could be incorporated into various types of components, including for example, but not limited to: a combustor liner 40 or 42, a combustor dome assembly 37 or splash plate 39, the exterior walls 60 or 62 of a turbine blade 46, the walls of a turbine nozzle airfoil 44, or the central portion 74 of a turbine shroud segment 49. The wall structure 100 comprises a wall 102 which has a first side or "hot side" 110 facing a flow of hot combustion gases, as shown by the arrow labeled A in FIG. 5. The second side or "cold side" 112 of the wall 102 is exposed to a flow of cooling fluid at a lower temperature as shown by the arrow labeled B in FIG. 5. Although Figure illustrates a cooling flow parallel to wall 102, it is noted that the present invention is equally applicable to an impingement-cooled wall structure wherein the flow of cooling air is directed towards the cold side 112 of the wall 102. The wall 102 may be formed from a conventional nickel-or cobalt-based superalloy. The wall 102 has a thickness t. A plurality of small diameter holes 104 are formed through the wall 102. The holes 104 may be formed, for example, by electron beam (EB) machining, electrical discharge machining (EDM), or laser drilling. Each hole has a diameter d. As seen in FIG. 6, the hole centers are laterally spaced apart by a center-to-center spacing S. The holes are formed completely through the wall 102, and therefore their length L is equal to the thickness t of the wall 102. The holes 104 each have a sidewall area 103 defined by the cylindrical hole sides formed in the wall 102. The total wetted area of the wall 102 is increased by the total sidewall area 103 of the holes 104, as described below.

The purpose of the holes 104 is to increase the wetted surface area of the wall 102. To achieve this result, it is beneficial to use closely spaced, small diameter holes that can be formed rapidly and economically. The diameter d of the holes 104 is limited by the capabilities of the drilling process used. Current electron beam (EB) drilling processes have a minimum hole diameter of about 0.076 mm (0.003 in.), a maximum hole diameter of about 1.0 mm (0.04 in.), and a maximum material thickness-to-hole diameter ratio of about 25:1. Such holes can be formed at the rate of about one to two thousand holes per second. However, to the extent that technologies become available to exceed these limitations, for example improved EB hole drilling processes, the benefit of the present invention could be obtained to a greater degree, because the wetted surface area could be further increased. The number, diameter d, and spacing S of the holes 104 may be varied to suit a particular application. To maximize the benefit of greater surface area enhancement over other methods, it is desirable to select the number, diameter d, and spacing S of the holes 104 in order to achieve an area enhancement $A/A_o$ of at least about 2.5. In one possible embodiment, the holes 104 are about 0.1 mm (0.004 in.) in diameter and have a center-to-center spacing S of about 3 hole diameters, or about 0.31 mm (0.012 in.), in a wall approximately 1.0 mm (0.04 in.) thick.

The wall structure 100 described above greatly increases the wetted surface area of a component for cooling. For example, considering for comparison purposes a selected portion of wall 102 having an area of one square inch, and choosing a hole diameter of 0.1 mm (0.004 in.) and a center-to-center hole spacing S of three times the hole diameter, or 0.3 mm (0.012 in), would result in over 6800 holes per square inch of the wall 102. For a wall thickness t (and therefore a hole length L) of 1.0 mm (0.04 in.), each hole 104 would have a sidewall area 103 of about 0.32 mm$^2$ (0.0005 in.$^2$) Therefore, the total additional surface area for one square inch of the wall 102, in comparison to the same area having no holes formed therein, would be approximately 21.9 cm$^2$ (3.4 in.$^2$), creating a total wetted area of about 28.4 cm$^2$ (4.4 in.$^2$) and resulting in an area enhancement $A/A_o$ of about 4.4. These hole diameters and spacings are within the known capabilities of laser, EDM, and EB machining techniques, as described above. This is a much greater area enhancement than other known methods. These parameters could be varied while still achieving the desired results. For example, the hole spacing S could be reduced to include more holes 104 per unit area, or the hole diameter d could be increased to increase the sidewall area 103 of each hole 104, so long as adequate material is left remaining between the holes 104 to provide the needed structural integrity. For example, in a wall 102 having a thickness t of 1.0 mm (0.04 in.), a hole diameter d of 1.0 mm (0.040 in.) and a hole spacing S of 1.5 hole diameters would result in an area enhancement $A/A_o$ of about 2.9. Alternatively, a hole diameter d of 0.076 mm (0.003 in.) and hole spacing S of 3.0 hole diameters would result in an area enhancement of $A/A_o$ of about 5.6. Both of these examples would have material thickness-to-hole diameter ratios within acceptable limits for current EB drilling technology.

An outer layer 106 is attached to the hot side 110 of the wall 102. In the illustrated example the outer layer 106 has a thickness of about 0.127 mm (0.005 in.) to about 0.254 mm (0.01 in.). The thickness of the outer layer 106 is not critical to achieving the cooling benefit from the enhanced surface area, although it may be kept to a small thickness for cost purposes, as described below. The outer layer 106 may comprise an alloy which is the same as or similar to the wall 102, for example a known nickel-based or cobalt-based superalloy.

Figure 7:
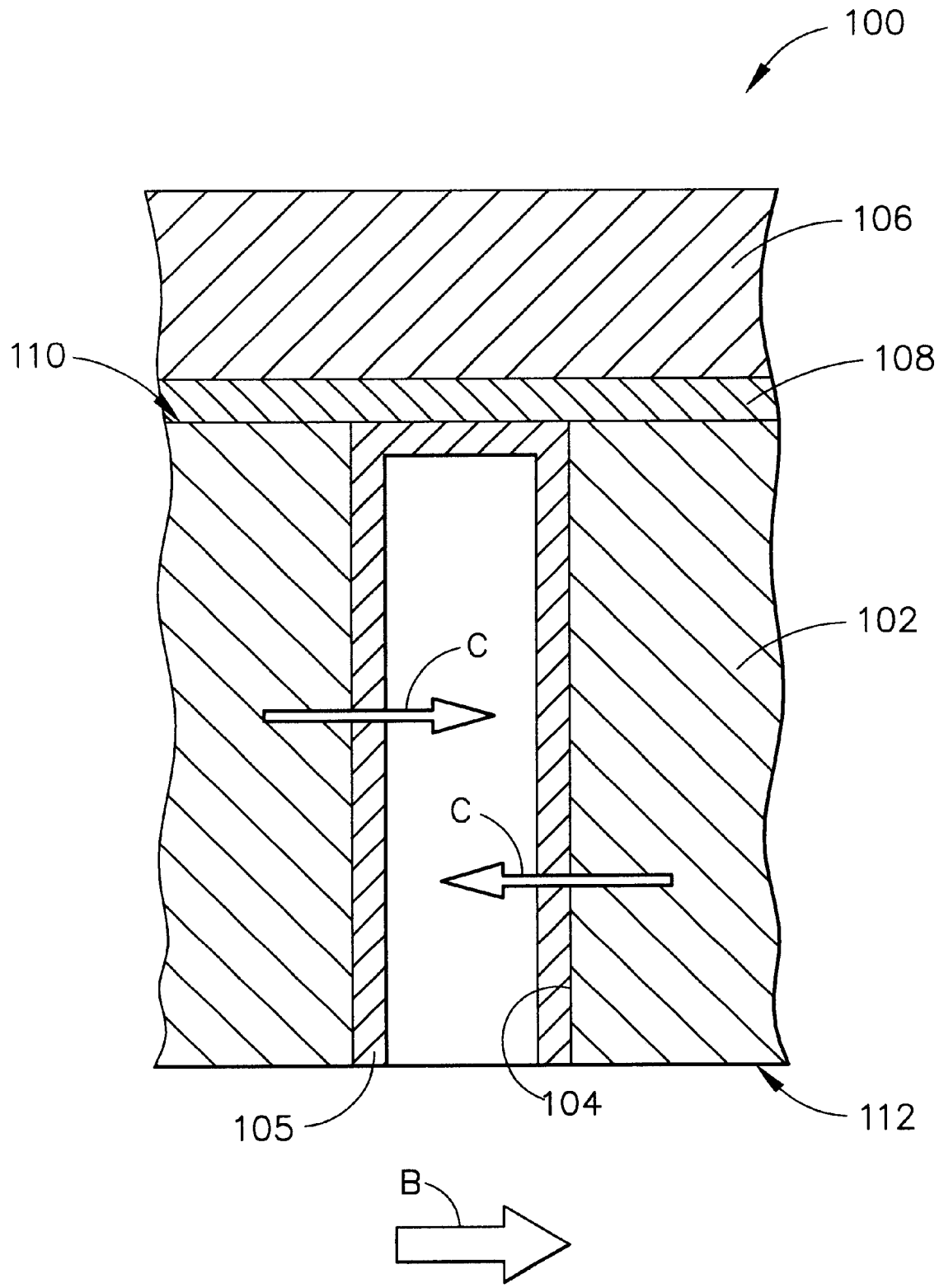
FIG. 7 is a cross-sectional view of a wall structure of the present invention in greater detail.

In some applications, the wall 102 may experience operating conditions such that it must be protected with an environmental coating 105, including the inner surfaces of the holes 104, as shown in FIG. 7. Known oxidation and corrosion resistant coatings, for example a nickel aluminide coating, may be used. The coating 105 may be applied by any known method, for example chemical vapor deposition (CVD) or a pack coating process. Where the coating 105 is used, the holes 104 would be drilled at an increased diameter in order to achieve the desired final diameter d while accommodating the coating 105. For example, if the coating 105 were to have an average thickness as applied of about 0.019 mm (0.00075 in.), the holes 104 would initially be drilled at about 0.14 mm (0.0055 in.). in diameter prior to the coating application. After coating, the final hole diameter d would be about 0.1 mm (0.004 in.).

In one possible embodiment, the outer layer 106 comprises a high temperature foil. By the use of the term "high temperature foil" it is meant a structure which is made from an alloy having improved strength and oxidation resistance over conventional superalloys at temperatures above 1093° C. (2000° F.), and capable of being formed to a thickness of about 0.51 mm (0.020 in.) or less. High temperature foils have an advantage over other similarly thin structures used in gas turbine applications in that they do not require large amounts of cooling air to achieve acceptable longevity. Suitable compositions of high temperature foils are described below. Depending on the type of high temperature foil used, an interface layer 108 may be disposed between the wall 102 and the outer layer 106. High temperature foils are quite expensive at the present time and should be kept as thin as possible to minimize the quantity, and therefore the cost, of the material used. The use of a high temperature foil for the outer layer 106 provides a durability benefit in addition to the cooling benefit from the enhanced wetted area, because the high temperature foil protects hot side of wall 102 directly from oxidation at high temperatures. An outer layer 106 formed from a high temperature foil would require less cooling air flow than an outer layer 106 formed from a conventional superalloy.

One suitable material that a high temperature foil may be formed from is a rhodium-based alloy comprising from about three atomic percent to about nine atomic percent of at least one precipitation-strengthening metal selected from the group consisting of zirconium, niobium, tantalum, titanium, hafnium, and mixtures thereof; up to about four atomic percent of at least one solution-strengthening metal selected from the group consisting of molybdenum, tungsten, rhenium, and mixtures thereof; from about one atomic percent to about five atomic percent ruthenium; up to about ten atomic percent platinum; up to about ten atomic percent palladium; and the balance rhodium; the alloy further comprising a face-centered-cubic phase and an $L1_2$-structured phase.

Another suitable material for the high temperature foil is a second rhodium-based alloy comprising rhodium, platinum, and palladium, wherein the alloy comprises a microstructure that is essentially free of $L1_2$-structured phase at a temperature greater than about 1000° C. (1832° F.). More particularly, the Pd is present in an amount ranging from about 1 atomic percent to about 41 atomic percent; the Pt is present in an amount that is dependent upon the amount of palladium, such that: a) for the amount of palladium ranging from about 1 atomic percent to about 14 atomic percent, the platinum is present up to about an amount defined by the formula (40+X) atomic percent, wherein X is the amount in atomic percent of the palladium; b) for the amount of palladium ranging from about 15 atomic percent up to about 41 atomic percent, the platinum is present in an amount up to about 54 atomic percent; and the balance comprises rhodium, wherein the rhodium is present in an amount of at least 24 atomic percent.

The high-temperature foil compositions described above exhibit about 1.2% thermal expansion from room temperature to about 1204° C. (2200° F.), whereas typical nickel-based superalloys used to form the wall 102 exhibit about 1.8% thermal expansion over the same temperature range. If the outer layer 106 were directly attached to the wall 102, the difference in thermal expansion between the Rh-based alloy and the superalloy would be large enough to cause concern due to stresses at the inter-mixed zone caused by differential thermal expansion. Therefore, it is desirable to incorporate an interface layer 108 between the outer layer 106 and the wall 102. The interface layer 108 has a thermal expansion intermediate to that of the high temperature foil and the superalloy, for example about 1.6% over the same temperature range.

In one possible embodiment, the interface layer 108 has a composition comprising from about 51 to about 61 atomic parts chromium, from about 18 to about 26 atomic parts palladium, and from about 18 to about 26 atomic parts nickel (but the nickel and palladium need not be present in equal amounts), and optionally has an addition of from about 5 to about 8 atomic parts aluminum. Minor amounts of other elements such as impurities may be present as well. The total of all of the elements is, 100 atomic percent. Nickel forms the balance of the interface layer 108. Preferably, the interface layer 108 comprises about 56 atomic parts chromium, about 22 atomic parts nickel, and about 22 atomic parts palladium.

The interface layer 108 may be applied as a solid piece and bonded to the surface of the wall 102. The interface layer 108 may instead be supplied as a weld filler material and melted onto the surface of the wall 102. Welding may be accomplished by any operable approach. In either case, during application and/or service an interdiffusion of the adjacent portions of the wall 102 and the interface layer 108 may occur. This interdiffusion is desired, as it tends to raise the melting point of the interface layer 108 and improve the oxidation resistance of the interdiffused combination.

The outer layer 106 is applied overlying the interface layer 108. The outer layer 106 is preferably applied by welding or brazing. In one approach it is applied as a solid piece. The underlying interface layer 108, which has a lower melting point than either the wall 102 or the outer layer 106, is melted during the application process and then resolidified to cause bonding of the interface layer 108 to the wall 102 and to the outer layer 106. In another approach, the outer layer 106 is attached to the interface layer 108 by welding, for example by electron beam welding or laser welding. Any operable welding technique may be used.

Another suitable alloy for use as a high temperature foil is a solid-solution strengthened nickel-based alloy composition including about 10 to about 15 wt % Co; about 18 to about 22 wt % Cr; about 0.5 to about 1.3 wt % Al; about 3.5 to about 4.5 wt % Ta; about 1 to about 2 wt % Mo; about 13.5 to about 17.0 wt % W; up to about 0.08 wt % C; up to about 0.06 wt % Zr; up to about 0.015 wt % B; about 0.4 to about 1.2 wt % Mn; about 0.1 to about 0.3 wt % Si; and balance Ni. According to a particular composition, C is present in an amount not less than about 0.02 wt %, Zr is present in an amount not less than about 0.01 wt %, B is present in an amount not less than about 0.005 wt %. In a preferable form, the composition includes about 13.5 wt % Co; about 20 wt % Cr; about 0.8 wt % Al; about 4 wt % Ta; about 1.5 wt % Mo; about 15.5 wt % W; about 0.05 wt % C; up to about 0.03 wt % Zr; up to about 0.01 wt % B; about 0.7 wt % Mn; about 0.2 wt % Si; and balance Ni. The composition may contain typical impurities.

Another suitable nickel-based alloy for the high temperature foil is an alloy composition including about up to about 5.1 wt % Co; about 7.2 to about 9.5 wt % Cr; about 7.4 to about 8.4 wt % Al; about 4.3 to about 5.6 wt % Ta; about 0.1 to about 0.5 wt % Si; about 0.1 to about 0.5 wt % Hf; up to about 0.05 wt % C; up to about 0.05 wt % B; about 0 to about 2.2 Re; about 2.7 to about 4.4 wt % W; and balance Ni. Preferably, the composition contains about 3 to about 4.0 wt % Co; about 7.2 to about 8.5 wt % Cr; about 5.0 to 5.6 Ta; about 0.1 to 0.25 Hf, and about 1.0 to about 2.2 Re.

Yet another suitable nickel-based material for the high temperature foil is an alloy composition including about 2 to about 5 wt % Co; about 5 to about 15 wt % Cr; about 7 to about 10 wt % Al; about 4 to about 6 wt % Ta; about 0.5 to about 1.5 wt % Si; about 0.1 to about 0.5 wt % Hf; up to about 0.05 wt % C; up to about 0.05 wt % B; about 1.0 to about 2.0 Re; about 3 to about 4.5 wt % W; and balance Ni. Preferably, the composition contains about 3 to about 3.5 wt % Co; about 7 to about 9 wt % Al; up to about 0.03 wt % C; and up to about 0.03 wt % B.

An outer layer 106 formed from a nickel-based high temperature foil as described above, or a foil with a composition similar to the wall 102, does not require an interface layer 108, as its thermal expansion is similar to that of the wall 102. The outer layer 106 is applied to the wall 102 as a solid piece, preferably by welding, for example by electron beam welding or laser welding. Any operable welding technique may be used. If the outer layer 106 is formed from a layer that is substantially thicker than the foils described above, then other techniques may be desirable for bonding the outer layer 106 to the wall 102, for example known brazing techniques.

In operation, hot flowpath gases flow past the outer layer 106 of the wall structure 100. Cooling air is provided to the cold side 112 of the wall 102 in a known manner and flows past the cold side. 112. The holes provide additional surface area for heat transfer, represented by arrows C in FIG. 7. A free convection flow is driven from the hot side 110 of the wall 102 to the cold side 112 of the wall 102 by the temperature gradient across the wall thickness. The portions of the holes 104 closest to the cold side 112 of the wall 102 are also subject to forced convection at the cold side 112 by the flow of cooling fluid parallel to the wall surface, as at arrow B. The cooling fluid could also be directed towards the cold side 112, as in an impingement cooling arrangement. Some of the relatively denser cooling fluid also flows into the holes 104, causing a circulation pattern within the holes 104. The holes 104 also create turbulence at the cold side 112 that improves heat transfer from the wall 102 to the cooling fluid. Even though the local heat transfer coefficient inside the holes 104 is not as large as on the surface of the cold side 112 of the wall 102, the overall effective heat transfer area of the wall structure 100 is still significantly increased.

The foregoing has described a wall structure for a gas turbine engine component which comprises a wall having a first side facing a flow of hot gases and a second side exposed to a source of cooling fluid. The wall has a plurality of holes formed therethrough, and an outer layer disposed on the first side. While specific embodiments of the present invention have been described, it will be apparent to those skilled in the art that various modifications thereto can be made without departing from the spirit and scope of the invention as defined in the appended claims.

What is claimed is:

1. A wall structure for a gas turbine engine component, comprising:
    a wall having a first side facing a flow of hot gases and a second side exposed to a flow of cooling fluid, said wall,having a plurality of holes formed therethrough; and
    an outer layer disposed on said first side of said wall.
2. The wall structure of claim 1 wherein said outer layer comprises a high temperature foil.
3. The wall structure of claim 2 wherein said high temperature foil comprises a rhodium-based alloy.
4. The wall structure of claim 3 further comprising an interface layer disposed between said wall and said outer layer.
5. The wall structure of claim 4 wherein said interface layer comprises chromium, palladium, and nickel.
6. The wall structure of claim 5 wherein said wall comprises a nickel-based superalloy.
7. The wall structure of claim 1 wherein said high temperature foil comprises a nickel-based alloy.
8. The wall structure of claim 1 wherein said wall and said outer layer comprise a nickel- or cobalt-based superalloy.
9. The wall structure of claim 1 wherein said wall has a thickness t, and said holes have a sidewall area and are spaced apart from each other by a spacing S, and wherein the number of holes, their sidewall area, and the spacing S are selected so that the total of the sidewall area of said holes disposed in a selected portion of said wall plus the surface area of said second side of said selected portion of said wall is at least about 2.5 times the surface area of said second side of said selected portion of said wall.
10. The wall structure of claim 1, wherein said wall is a portion of an arcuate turbine shroud segment.
11. A combustor liner for a gas turbine engine, comprising:
    a circumferentially extending wall enclosing a combustion chamber, said wall having a first side facing a flow of hot gases and a second side exposed to a flow of cooling fluid, said wall having a plurality of holes formed therethrough; and
    an outer layer disposed on said first side of said wall.
12. The combustor liner of claim 11 wherein said outer layer comprises a high temperature foil.

13. The combustor liner of claim 12 wherein said high temperature foil comprises a rhodium-based alloy.

14. The combustor liner of claim 13 further comprising an interface layer disposed between said wall and said outer layer.

15. The combustor liner of claim 14 wherein said interface layer comprises chromium, palladium, and nickel.

16. The combustor liner of claim 15 wherein said wall comprises a nickel-based superalloy.

17. The combustor liner of claim 11 wherein said high temperature foil comprises a nickel-based alloy.

18. The combustor liner of claim 11 wherein said wall and said outer layer comprise a nickel- or cobalt-based superalloy.

19. The combustor liner of claim 11 wherein said wall has a thickness t, and said holes have a sidewall area and are spaced apart from each other by a spacing S, and wherein the number of holes, their sidewall area, and the spacing S are selected so that the total of the sidewall area of said holes disposed in a selected portion of said wall plus the surface area of said second side of said selected portion of said wall is at least about 2.5 times the surface area of said second side of said selected portion of said wall.

20. A turbine airfoil, comprising:
first and second spaced-apart walls extending from a leading edge of said airfoil to a trailing edge of said airfoil, wherein at least one of said walls has a first side facing a flow of hot gases and a second side exposed to a flow of cooling fluid, said one of said walls having a plurality of holes formed therethrough; and
an outer layer disposed on said first side of said one of said walls.

21. The turbine airfoil of claim 20 wherein said outer layer comprises a high temperature foil.

22. The turbine airfoil of claim 21 wherein said high temperature foil comprises a rhodium-based alloy.

23. The turbine airfoil of claim 22 further comprising an interface layer disposed between said wall and said outer layer.

24. The turbine airfoil of claim 23 wherein said interface layer comprises chromium, palladium, and nickel.

25. The turbine airfoil of claim 24 wherein said wall comprises a nickel-based superalloy.

26. The turbine airfoil of claim 20 wherein said high temperature foil comprises a nickel-based alloy.

27. The turbine airfoil of claim 20 wherein said wall and said outer layer comprise a nickel- or cobalt-based superalloy.

28. The turbine airfoil of claim 20 wherein said wall has a thickness t, and said holes have a sidewall area and are spaced apart from each other by a spacing S, and wherein the number of holes, their sidewall area, and the spacing S are selected so that the total of the sidewall area of said holes disposed in a selected portion of said wall plus the surface area of said second side of said selected portion of said wall is at least about 2.5 times the surface area of said second side of said selected portion of said wall.

* * * * *